Feb. 6, 1951     C. N. ROSWELL     2,540,293
LIQUID HEATER

Filed Aug. 20, 1947     3 Sheets-Sheet 1

Inventor:
Charles Neil Roswell
By: Chritton, Schroeder,
Merriam & Byron Atty's.

Feb. 6, 1951        C. N. ROSWELL        2,540,293
LIQUID HEATER
Filed Aug. 20, 1947        3 Sheets-Sheet 2
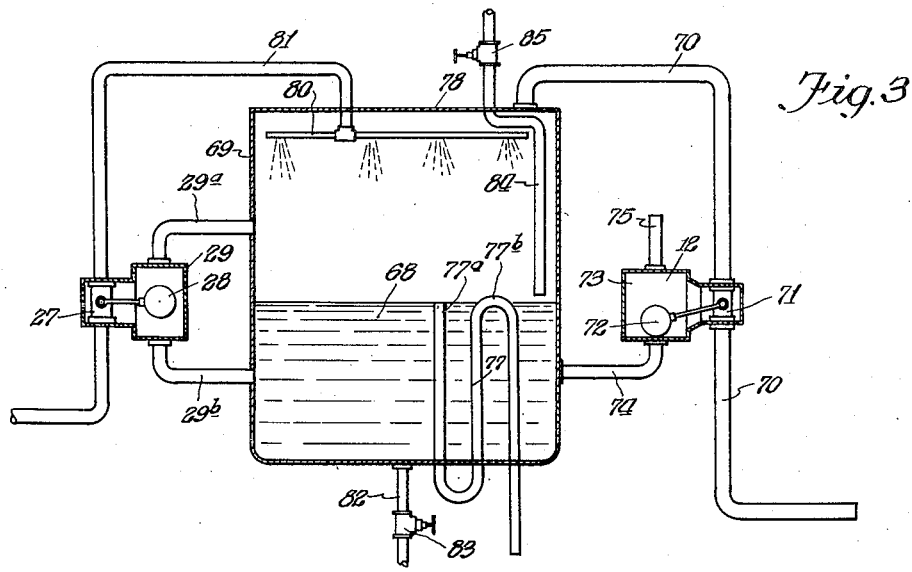
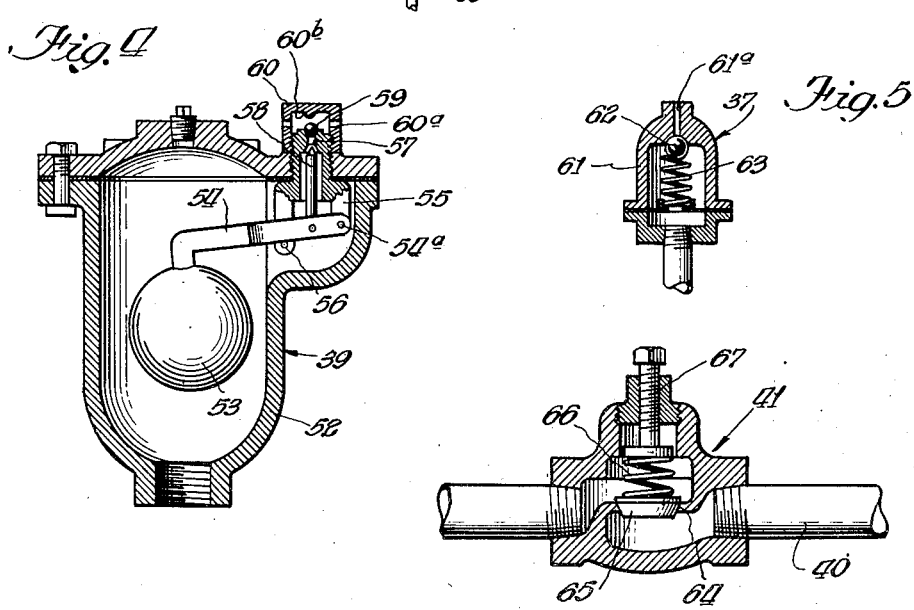
Inventor:
Charles Neil Roswell
By: *[signatures]*, Atty's.

Feb. 6, 1951 C. N. ROSWELL 2,540,293
LIQUID HEATER
Filed Aug. 20, 1947 3 Sheets-Sheet 3

Inventor:
Charles Neil Roswell

Patented Feb. 6, 1951

2,540,293

UNITED STATES PATENT OFFICE 2,540,293

LIQUID HEATER

Charles Neil Roswell, Chicago, Ill.

Application August 20, 1947, Serial No. 769,594

10 Claims. (Cl. 257—2)

This invention relates to a liquid heater and particularly to an improved means for regulating steam at low pressure to the heater, and also means for maintaining the liquid in the steam condensate-receiving portion of the heater at a substantially constant level.

Heating systems for heating materials ordinarily use steam as the heating medium. Means are usually provided for maintaining this steam at a substantially constant pressure in the heater so that the temperature of the heating can be regulated. Many of these devices for maintaining substantially constant steam pressure have been cumbersome, relatively expensive, and somewhat erratic in their operation. I have invented an improved and simple apparatus for controlling the steam pressure wherein this pressure is controlled by a liquid in the heater. This liquid is preferably the liquid in the steam condensate-receiving portion of the heater. I have also invented improved means for maintaining this liquid at a substantially constant level which may be varied as desired for any operation.

Figure 1:
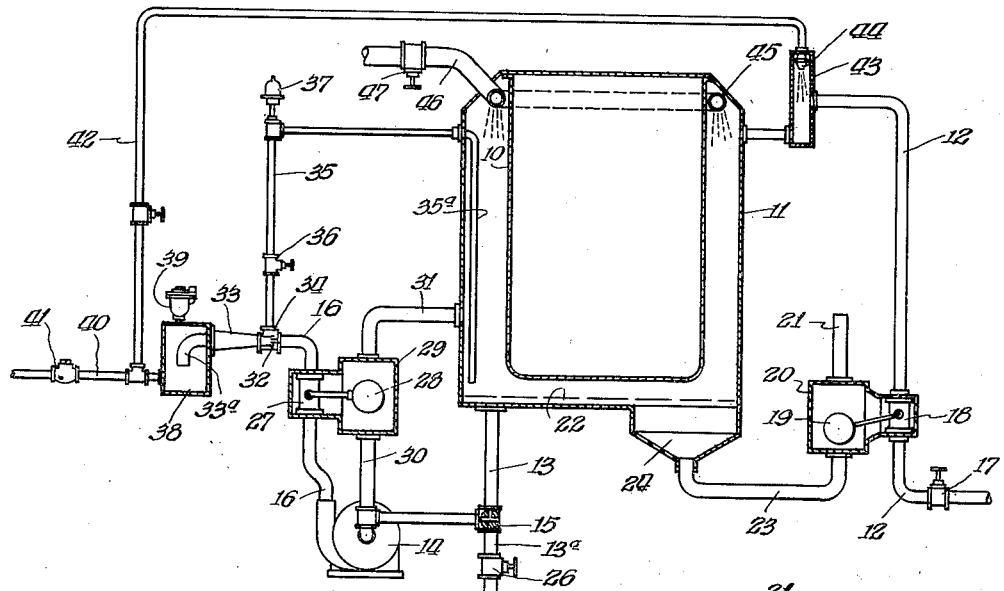
Figure 2:
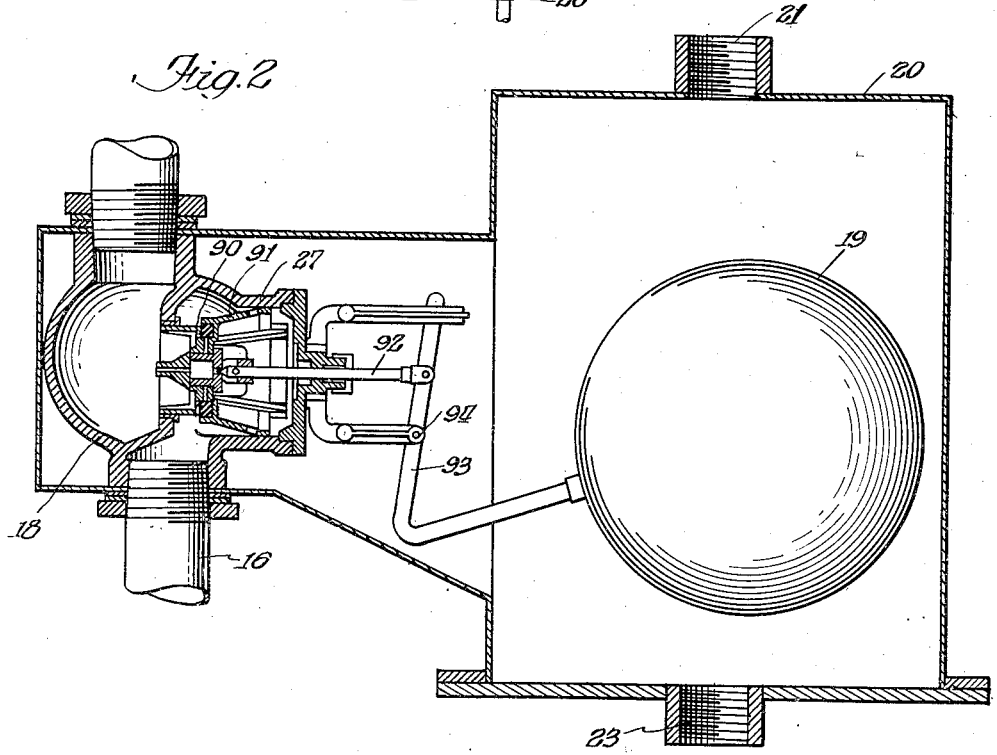
Figure 7:
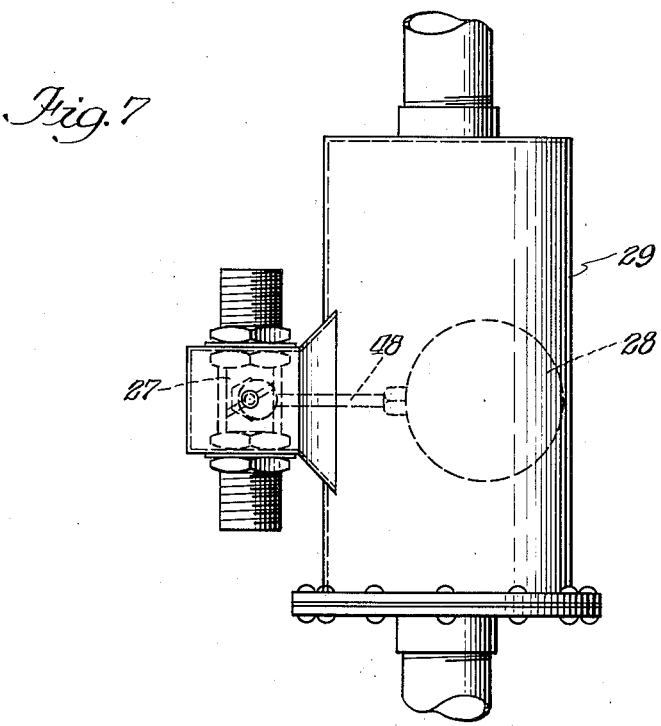
Figure 8:
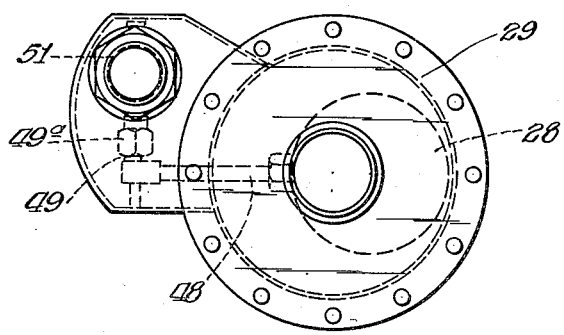

The invention will be described as related to the embodiments shown in the accompanying drawings. Of the drawings, Fig. 1 is a semi-diagrammatic view showing a liquid heater constructed according to the principles of this invention; Fig. 2 is a sectional elevation of a float control valve used in the liquid heater; Fig. 3 is a semi-diagrammatic view illustrating a second embodiment of the invention; Fig. 4 is a sectional elevation of a float valve for permitting the escape of gases; Fig. 5 is a sectional elevation of a vacuum relief valve; Fig. 6 is a sectional elevation of a valve for creating back pressure; Fig. 7 is an elevation of a second type of float valve; and Fig. 8 is a plan view of the valve of Fig. 7.

In the embodiment shown in Fig. 1, there is provided a vessel 10 having a steam jacket 11 around the bottom and sides of the vessel, a steam line 12 leading to the top portion of the jacket 11, a condensate withdrawal line 13 communicating with the bottom of the jacket 11, a centrifugal pump 14 having its intake side connected to the condensate line 13 through a 3-way valve 15, and a condensate exhaust line 16 connecting to the exhaust side of the pump 14.

The steam line 12 is provided with a hand-operated valve 17 at one point in the line and a float-operated valve 18 at another point in this line. This latter valve is attached to and operated by a float 19 located in a float chamber 20. The float chamber 20 has its bottom portion connected through a line 23 to a sump 24 at the bottom of the steam jacket 11. The horizontal cross sectional area of the sump 24 is relatively large. A line 21 is provided at the top of the float chamber with this line being open to the atmosphere.

The condensate withdrawal line 13 is provided with a portion 13a beyond the 3-way valve 15 with this portion having a hand-operated valve 26 therein.

The condensate exhaust line 16 that is attached to the exhaust side of the pump 14 is provided with a float-operated valve 27 that is similar to the float-operated valve 18. This latter float-operated valve is arranged to be operated by float 28 located within a float chamber 29 with the float 28 and float chamber 29 being similar to float 19 and float chamber 20 that have been previously described. The float chamber 29 has its bottom portion attached by means of a line 30 to the condensate withdrawal line 13. For convenience, the point of attachment is just above the intake side of the pump 14, as is shown in Fig. 1. The top of the float chamber 29 is attached by means of a line 31 to the steam jacket 11 at a point above the normal condensate level here indicated by the numeral 22.

The condensate exhaust line 16 on the side of the float valve 27 that is opposite the pump 14 is attached to Venturi ejector 32. This Venturi ejector 32 exhausts into an expanding pipe 33 and its purpose is to create a vacuum in the fitting 34 around the Venturi ejector. This fitting is connected through a vacuum line 35 to the top portion of the steam jacket 11 and a pipe 35a extended to within about 4" of level line 22. This is used to withdraw non-condensible gases from within the steam jacket 11. This vacuum line is provided with a hand-operated valve 36 and a vacuum relief valve 37.

The expanding pipe 33 communicates with a gas expansion chamber 38 and exhausts into this chamber through a downwardly directed pipe 33a. The top of the expansion chamber 38 is provided with a float-operated escape valve 39 (Fig. 4) to permit the escape of the non-condensible gases drawn from the steam jacket 11.

The gas expansion chamber 38 is provided with a liquid exhaust line 40 through which the condensate liquid is exhausted into a sewer or other disposal means. In this exhaust line 40, there is provided a back pressure valve 41 (Fig. 6) for creating pressure within the exhaust line 40 behind the valve 41. This portion of the line 40 is connected by means of a condensate line 42 to a steam desuperheating chamber 43 in the steam line 12. The condensate is arranged to be forced through this line by the back pressure created by the back pressure valve 41 and sprayed by means of a nozzle 44 into the desuperheating chamber 43. This condensate serves to desuperheat the steam entering the steam jacket 11.

The steam jacketed vessel 10 may be provided, if desired, with cooling means comprising a circular pipe 45 around the top of the vessel 10 within the steam jacket 11 and provided with small holes in the bottom thereof to spray cooling water against the outer surface of the vessel 10. This circular pipe 45 is connected by means of a pipe 46 having a hand-operated valve 47 therein to a source of cooling water under pressure.

With the construction just described, steam may be supplied to the jacket 11 around the vessel 10 at any desired low pressure, such as a pressure range of 0 to 4 oz. gauge pressure. This pressure is maintained approximately constant by means of the float-operated valve 18 and the float 19 (Fig. 2). The level 22 of condensate in the float chamber 20 will be equal to the level of the condensate at the bottom of the steam jacket 11 when no pressure is in the steam jacket 11. Steam pressure within the jacket operating on the condensate at the bottom of the jacket will force condensate to a higher level within the chamber 20 and thereby raise the float 19 and close the valve 18. The sump 24 enables the condensate to move into the chamber 20 at a rapid rate. With the valve 18 closed, or nearly closed, the steam pressure within the jacket 11 drops. This permits the level of condensate within the chamber 20 to fall thereby lowering the float 19 and opening the valve 18. With this arrangement, steam is maintained within the jacket 11 at approximately constant pressure with this pressure being dependent on the heighth of the float 19 above the normal level of the condensate within the jacket 11 when no steam pressure is within the jacket.

The condensate level within the jacket 11 is maintained approximately constant by means of the float 28 and the float-operated valve 27. The float 28 and valve 27 are shown in greater detail in Figs. 7 and 8. The float 28 is located in a chamber 29 and is arranged to open the valve when the float rises. The float is connected by means of a stem 48 to a rod 49 which in turn is connected to a butterfly valve arranged to seat against a valve seat 51. The rod 49 is rotatably held in a bearing 49a. As the float 28 rises, the rod 49 is turned within the bearing 49a to move the valve member 50 away from the seat 51. This permits condensate to flow through the valve. As the float 28 falls, the rod 49 turns in an opposite direction and causes the member 50 to be pressed against the valve seat 51 and close the valve.

In Fig. 2 there is shown in greater detail the steam inlet valve of Fig. 1. This valve, which is shown and described in my copending application Serial No. 737,676, filed March 27, 1947, now Patent No. 2,533,141, comprises a valve seat 90, a valve member adapted to be held against said seat, a pin 92 connected to the valve member 92, and a lever 93 attached to the float 19 and fulcrumed at 94 and also attached to the pin 92. As can be seen in Fig. 2, raising of the float 19 closes the valve and lowering of the float opens the valve.

The escape valve 39 that is provided for the escape of non-condensible gases is shown in greater detail in Fig. 4. This valve comprises a chamber 52 having a float 53 therein with the float being mounted on an arm 54 that has one end fulcrumed at 54a on a bracket 55. The movement of the float 53 in a downward direction is limited by means of a stop 56, with the arm 54 adapted to rest on this stop, as shown in Fig. 4. The top of the chamber 53 is provided with an opening 57 arranged to be closed by a pin 58 that is rotatably attached to the arm 54. As the float 53 arises, the pin 58 engages the opening 57 and closes it. At the top of the opening 57 there is located a ball 59 with this ball being arranged to be raised by escaping gases to permit the gases to flow, but to prevent air being drawn into the chamber 52 when there is a vacuum within the chamber. The outer end of the opening 57 and the ball 59 are enclosed by a cap 60 having openings 60a therein through which the gases may escape. This cap 60 is provided with a downwardly extending portion 60b located immediately above the ball 59 so as to insure the ball always returning to its seat. In the operation of the device, condensate within the chamber 38 will rise within the valve chamber 52 and the non-condensible gases will gather in the top of the chamber 52 above the condensate. If the condensate level rises to a point where there is danger of the condensate escaping, the float 53 will rise and cause the pin 58 to close the opening 57. When the float 53 is down, however, the gases may escape through the openings 57 and 60a as these gases, being under pressure, will cause the ball to raise.

As has been already described, the vacuum line 35 is provided with a vacuum relief valve 37. This valve is shown in greater detail in Fig. 5. The valve comprises a chamber 61 having an opening 61a at the top thereof with this opening being normally closed by a ball 62 held in place by a spring 63. When the vacuum in the system gets beyond a predetermined value that is determined by the strength of the spring 63, air pressure operating through the opening 61a will cause the ball 62 to move downwardly and permit air to enter the vacuum line and lower the vacuum.

The back pressure valve 41 that is provided in the condensate exhaust line 40 is shown in greater detail in Fig. 6. This valve comprises a valve seat 64 arranged to be closed by a valve member 65 that is normally held against the seat by means of a compression spring 66. The force of the spring 66 may be adjusted by means of the threaded bolt 67. With this valve, back pressure is created in the line 40 so that the condensate may be forced through the line 42 into the steam desuperheating chamber 43.

In the embodiment of the invention shown in Fig. 3, the liquid 68 to be heated is maintained within a chamber 69. Steam is fed into the chamber through a steam line 70 with this steam line communicating with the chamber 69 at the top thereof. The liquid 68 that is already in the heater is heated by direct contact of the steam with the liquid. Steam condensate is therefore mixed with the liquid 68.

The steam pressure fed into the chamber 69 through the steam line 70 is regulated by means of a float-operated valve 71 attached to a float 72 that is located in a float chamber 73. The bottom of the float chamber 73 is connected by means of a line 74 to the chamber 69 at a point below the normal liquid level within the chamber 69. The top of the float chamber 73 is provided with a line 75 opening to the atmosphere.

Steam pressure within the chamber 69 will cause the liquid level in the float chamber 73 to rise thereby raising the float 72. As the float rises, the valve 71 will close. Steam pressure within the chamber 69 immediately falls and this lowers the level of liquid within the float chamber 73 thereby causing the float 72 to fall and open the valve 71. With this arrangement, very close control can be had on the steam pressure within the chamber 69. This steam pressure is dependent upon the heighth of the float 72 above the normal liquid level within the chamber 69 when no steam pressure is within the chamber. It can thus be seen from this description that the float 72 and valve 71 are similar in operation to the float 19 and valve 18 previously described with respect to the embodiment of Fig. 1 and shown in detail in Fig. 2.

A syphon 77 is provided in order to control the maximum liquid level. The syphon has an inner end 77a and a top curve 77b whose top portion is located just above the inner end 77a of the syphon. The liquid level is regulated by the heighth of the curved portion, 77b of the syphon, and this regulates the maximum level, causing any liquid beyond this level to overflow. As shown, the liquid heater is arranged to operate on very low steam pressure; for example, 0 to 7 oz. per square inch gauge pressure.

The top of the heating chamber 69 is provided with a long perforated pipe 80 that serves as a series of spray nozzles. This pipe is connected to the end of a feed pipe 81 by means of which the liquid to be heated is fed into the perforated pipe 80 and sprayed through an atmosphere of steam at the top of the heating chamber 69. As the liquid to be heated is in the form of small droplets, there is a rapid heat transfer from the steam to the droplets. These droplets then fall into the body of liquid 68.

The amount of liquid fed through the pipe 81 is controlled by a float valve 27 that is operated by a float 28 located within a float chamber 29. This float valve and float are preferably similar to that shown in Fig. 1 and in greater detail in Figs. 7 and 8. The top of the float chamber 29 is in communication with the heating chamber 69 at a point above the liquid level within the chamber through a top pipe 29a. The bottom of the float chamber 29 is also in communication with the heating chamber 69 at a point below the liquid level by means of a pipe 29b. The valve 27 and float 28 are so arranged that when the float 28 rises the valve is closed and when the float 28 falls the valve is opened. With this arrangement, the amount of liquid fed into the heating chamber is controlled by the level of liquid within the chamber. This liquid level cannot exceed a predetermined maximum because of the operation of the syphon 77. The operation of this syphon has already been described.

The heated liquid may be withdrawn from the heater by means of a withdrawal pipe 82 located at the bottom of the heater. Flow through this pipe is controlled by a hand-operated valve 83.

In order to remove non-condensible gases from above the liquid level in the heating chamber 69, there is provided a vent pipe 84 in the chamber extending to a few inches above the level of the liquid 68. This pipe, which is provided with a hand valve 85, may be connected to any suitable source of vacuum. The vent pipe may be operated continuously or intermittently as desired.

As the liquid to be heated is sprayed into the chamber 69, it absorbs the steam and lowers the steam pressure. The lowering of the steam pressure within the chamber 69 lowers the liquid level in the float chamber 73 and causes the steam valve 71 to open, thereby admitting additional steam to maintain equilibrium conditions. The steam pressure within the chamber 69 is thereby maintained substantially constant at all times and very close control may be had even when operating at extremely low steam pressures.

Having described my invention as related to the various embodiments of the same, it is my intention that the invention be not limited by any of the details of description unless otherwise specified, but rather be construed broadly within the spirit and scope as set out in the accompanying claims.

I claim:

1. A liquid heater adapted to contain liquid and having a condensate-receiving portion therein, a steam line connected to the heater at a point above the highest condensate level, a float chamber communicating with the condensate-receiving portion of the heater at a point below the desired condensate level, a valve in said steam line, a float in said float chamber raised and lowered by raising and lowering of said condensate level, said float being attached to said valve to close the valve when the condensate level and the float rises and open the valve when the condensate level and the float falls, means for withdrawing liquid from the condensate-receiving portion, and means operable by the rising condensate level for actuating said liquid withdrawing means and operable by the falling of the condensate level for stopping said liquid withdrawing means, the combination of said float and valve and said actuating means serving to maintain a substantially constant level in said condensate-receiving portion, and said float and valve additionally serving to maintain a substantially constant steam pressure within the heater with this pressure being dependent on the distance of the float above said desired condensate level.

2. The liquid heater of claim 1 wherein the bottom of the condensate-receiving portion is provided with a sump having a relatively large horizontal area, with the bottom of the float chamber communicating with said sump.

3. The liquid heater of claim 1 wherein the liquid level maintaining means includes a syphon communicating with the condensate-receiving portion of the heater.

4. The liquid heater of claim 1 wherein the means for maintaining the liquid in the condensate-receiving portion at a substantially constant level comprises a liquid feed line communicating with the heater at a point above the highest liquid level, a valve therein, a float chamber communicating with the heater at points above and below said highest liquid level, and a float in said float chamber operatively connected to said valve to close the valve when the float rises and open the valve when the float falls.

5. A liquid heater adapted to contain liquid and having a condensate-receiving portion therein, a steam line connected to the heater at a point above the highest condensate level, a float chamber communicating with the condensate-receiving portion of the heater at a point below the desired condensate level, a valve in said steam line, a float in said float chamber attached to said valve to close the valve when the float rises and open the valve when the float falls, a condensate withdrawal line including a centrifugal pump, a valve in the discharge line from the pump, a float chamber communicating with the condensate-receiving portion of the heater at points above and below the desired condensate level in the heater, a float in the float chamber substantially horizontally aligned with the desired condensate level and attached to the valve so that when the float rises the valve is opened and when the float falls the valve is closed, said float and valve serving to maintain the condensate level approximately constant, means in the withdrawal line for creating a vacuum including a Venturi ejector through which the condensate is forced, a line between said vacuum-creating means and the condensate-receiving portion of the heater to remove non-condensable gases, an expansion chamber beyond the vacuum-creating means for separating said gases from the condensate, and a vent in said chamber for said gases.

6. A liquid heater adapted to contain liquid and having a condensate-receiving portion therein, a steam line connected to the heater at point above the highest condensate level, a float chamber communicating with the condensate-receiving portion of the heater at a point below the desired condensate level, a valve in said steam line, a float in said float chamber attached to said valve to close the valve when the float rises and open the valve when the float falls, a condensate withdrawal line including a centrifugal pump, a valve in the discharge line from the pump, a float chamber communicating with the condensate-receiving portion of the heater at points above and below the desired condensate level in the heater, a float in the float chamber substantially horizontally aligned with the desired condensate level and attached to the valve so that when the float rises the valve is opened and when the float falls the valve is closed, said float and valve serving to maintain the condensate level approximately constant, means in the withdrawal line for creating a vacuum including a Venturi ejector through which the condensate is forced, a line between said vacuum-creating means and the condensate-receiving portion of the heater to remove non-condensible gases, an expansion chamber beyond the vacuum-creating means for separating said gases from the condensate, means in the outlet line from the pump for raising the pressure of the condensate in said condensate withdrawal line, and a line between said condensate withdrawal line and the steam line for returning at least a portion of the condensate to the steam line for desuperheating the steam, said pressure raising means being located beyond said expansion chamber.

7. A liquid heater adapted to contain liquid and having a condensate-receiving portion therein, a steam line connected to the heater at a point above the highest condensate level, a float chamber communicating with the condensate-receiving portion of the heater at a point below the desired condensate level, a valve in said steam line, a float in said float chamber attached to said valve to close the valve when the float rises and open the valve when the float falls, said float and valve serving to maintain a substantially constant steam pressure within the heater with this pressure being dependent on the distance of the float above said desired condensate level, and means for maintaining the liquid in the condensate-receiving portion at a substantially constant level with said means including a second float chamber connected to said condensate-receiving portion at points above and below said desired level, a second float in said second chamber, a pump arranged to withdraw the condensate, and a valve in the discharge line from the pump and connected to said second float, said second float chamber being substantially horizontally aligned with the desired condensate level so that when the second float rises the valve is opened and when the second float falls the valve is closed.

8. A liquid heater adapted to contain liquid and having a condensate-receiving portion therein, a steam line connected to the heater at a point above the highest condensate level, a float chamber communicating with the condensate-receiving portion of the heater at a point below the desired condensate level, a valve in said steam line, a float in said float chamber attached to said valve to close the valve when the float rises and open the valve when the float falls, means for withdrawing liquid from the condensate-receiving portion, and means for maintaining the liquid in the condensate-receiving portion at a substantially constant level, said float and valve serving to maintain a substantially constant steam pressure within the heater with this pressure being dependent on the distance of the float above said desired condensate level, the means for withdrawing the liquid from the condensate-receiving portion comprising a condensate withdrawal line including a pump means, means in the withdrawal line for creating a vacuum including a Venturi ejector through which the condensate is forced, and a line between said vacuum-creating means and the condensate-receiving portion of the heater to remove non-condensible gases.

9. A liquid heater adapted to contain liquid and having a condensate-receiving portion therein, a steam line connected to the heater at a point above the highest condensate level, a float chamber communicating with the condensate-receiving portion of the heater at a point below the desired condensate level, a valve in said steam line, a float in said float chamber attached to said valve to close the valve when the float rises and open the valve when the float falls, means for withdrawing liquid from the condensate-receiving portion, and means for maintaining the liquid in the condensate-receiving portion at a substantially constant level, said float and valve serving to maintain a substantially constant steam pressure within the heater with this pressure being dependent on the distance of the float above said desired condensate level, the means for withdrawing liquid from the condensate-receiving portion comprising a condensate withdrawal line including a pump means, means in the withdrawal line for creating a vacuum including a Venturi ejector through which the condensate is forced, a line between said vacuum-creating means and the condensate-receiving portion of the heater to remove non-condensible gases, an expansion chamber beyond the vacuum-creating means for separating said gases from the condensate, and a vent in said chamber for said gases.

10. A liquid heater adapted to contain liquid and having a condensate-receiving portion therein, a steam line connected to the heater at a point above the highest condensate level, a float chamber communicating with the condensate-receiving portion of the heater at a point below the desired condensate level, a valve in said steam line, a float in said float chamber attached to said valve to close the valve when the float rises and open the valve when the float falls, means for withdrawing liquid from the condensate-receiving portion, and means for maintaining the liquid in the condensate-receiving portion at a substantially constant level, said float and valve serving to maintain a substantially constant steam pressure within the heater with this pressure being dependent on the distance of the float above said desired condensate level, the means for withdrawing liquid from the condensate-receiving portion comprising a condensate withdrawal line including a pump means, means in the outlet line from the pump for raising the pressure of the condensate in said condensate withdrawal line, and a line between said condensate withdrawal line and the steam line for returning at least a portion of the condensate to the steam line for desuperheating the steam.

CHARLES NEIL ROSWELL.

REFERENCES CITED

The following references are of record in the file of this patent:

UNITED STATES PATENTS

| Number | Name | Date |
| --- | --- | --- |
| 911,829 | Mauvernay | Feb. 9, 1909 |

FOREIGN PATENTS

| Number | Country | Date |
| --- | --- | --- |
| 785,132 | France | Aug. 2, 1935 |